(12) United States Patent
Ledvina et al.

(10) Patent No.: US 10,802,158 B2
(45) Date of Patent: Oct. 13, 2020

(54) DYNAMIC COHERENT INTEGRATION

(71) Applicant: Apple Inc., Cupertino, CA (US)

(72) Inventors: Brent M. Ledvina, San Francisco, CA (US); Isaac Thomas Miller, El Granada, CA (US)

(73) Assignee: APPLE INC., Cupertino, CA (US)

( * ) Notice: Subject to any disclaimer, the term of this patent is extended or adjusted under 35 U.S.C. 154(b) by 661 days.

(21) Appl. No.: 14/871,891

(22) Filed: Sep. 30, 2015

(65) Prior Publication Data

US 2017/0090037 A1    Mar. 30, 2017

(51) Int. Cl.
*G01S 19/29* (2010.01)
*H04W 88/02* (2009.01)
*G01S 19/21* (2010.01)

(52) U.S. Cl.
CPC .............. *G01S 19/29* (2013.01); *G01S 19/21* (2013.01); *H04W 88/02* (2013.01)

(58) Field of Classification Search
CPC ...... G01S 19/25; G01S 19/256; G01S 19/246; G01S 19/26; G01S 19/29; G01S 19/30; G01S 19/13; G01S 19/55; G01S 19/21; H04B 1/7075; H04B 1/709; H04B 1/7087; H04W 88/02
See application file for complete search history.

(56) References Cited

U.S. PATENT DOCUMENTS

| | | | |
|---|---|---|---|
| 6,118,808 A | 9/2000 | Tiemann et al. | |
| 6,931,055 B1* | 8/2005 | Underbrink | G01S 19/29 375/142 |
| 8,094,072 B2 | 1/2012 | Pon | |
| 2003/0018430 A1* | 1/2003 | Ladetto | G01C 21/16 701/472 |
| 2006/0012515 A1* | 1/2006 | Park | G01S 19/254 342/357.59 |
| 2007/0040740 A1* | 2/2007 | Abraham | G01S 1/045 342/357.59 |
| 2008/0316095 A1* | 12/2008 | Murakami | G01S 19/30 342/357.69 |
| 2009/0273514 A1* | 11/2009 | Pon | G01S 19/24 342/357.29 |

(Continued)

FOREIGN PATENT DOCUMENTS

CN    102890280    4/2014

OTHER PUBLICATIONS

Dierendonck, Chpt 8 "GPS Receives," Global Positioning System: Theory and Applications vol. 1, 1996, 81 pages.

(Continued)

*Primary Examiner* — Bernarr E Gregory
*Assistant Examiner* — Michael W Justice
(74) *Attorney, Agent, or Firm* — Jaffery Watson Mendonsa & Hamilton LLP

(57) ABSTRACT

Systems, methods and computer program products for determining extended coherent integration intervals based on information about user activity, dynamics and clock stability. Dynamically extending the coherent integration interval increases the signal-to-noise ratio during signal acquisition and tracking, thereby providing a benefit when antenna gain is poor, in weak signal conditions, and when being jammed, or when power needs to be conserved, compared to extending the coherent integration interval for a fixed amount of time.

19 Claims, 8 Drawing Sheets

(56) References Cited

U.S. PATENT DOCUMENTS

| | | | |
|---|---|---|---|
| 2010/0141520 A1* | 6/2010 | Ghinamo | G01S 19/24 |
| | | | 342/357.63 |
| 2010/0210206 A1* | 8/2010 | Young | G01S 19/30 |
| | | | 455/13.4 |
| 2011/0068979 A1 | 3/2011 | Waters et al. | |
| 2013/0029681 A1* | 1/2013 | Grokop | G01C 21/16 |
| | | | 455/456.1 |
| 2014/0111418 A1* | 4/2014 | Lee | H04M 1/72569 |
| | | | 345/156 |
| 2015/0316651 A1* | 11/2015 | Kurby | G01S 19/246 |
| | | | 342/357.51 |
| 2016/0084869 A1* | 3/2016 | Yuen | G01P 7/00 |
| | | | 73/510 |
| 2016/0253560 A1* | 9/2016 | Tokutake | G06F 3/0412 |
| | | | 382/103 |
| 2017/0202486 A1* | 7/2017 | Martikka | A61B 5/02416 |

OTHER PUBLICATIONS

Thompson et al., Chpt 9 "Very-Long-Baseline Interferometry," Interferometry and Synthesis in Radio Astronomy, 2001, 81 pages.

Wesson et al., "Opportunistic Frequency Stability Transfer for Extending the Coherence Time of GNSS Receiver Clocks," 2010 ION GNSS Conference, Sep. 22-25, 2010, 10 pages.

* cited by examiner

DYNAMIC COHERENT INTEGRATION

TECHNICAL FIELD

This disclosure relates generally to location determination using radio signals.

BACKGROUND

Extending coherent integration may improve global navigation satellite system (GNSS) signal acquisition and tracking sensitivity by increasing post-correlation signal-to-noise ratio (SNR). In coherent integration, also known as coherent averaging, sensitivity improvement grows more rapidly than that gained from non-coherent integration. Accordingly, coherent integration of a given duration outperforms non-coherent integration for the same duration. The coherent gain is, at least in part, a function of the input carrier-to-noise density and integration interval. Coherent integration can provide as much as 1.5-6 dB of gain in sensitivity for acquisition and tracking, and in some cases even more gain.

Acquiring and tracking GNSS signals may be challenging for mobile devices. Mobile devices (e.g., smart phones or wearable devices) sometimes are equipped with poor-efficiency GNSS antennas, carried to harsh signal environments (e.g., indoor areas or "urban canyons" surround by signal-blocking high-rise buildings), experience jamming, and tend to have strict power consumption requirements. The first three factors as described above, including inefficient antennas, harsh environments, and jamming, may lower a signal's carrier-to-noise density at the output of the antenna feed. The fourth factor as described above, including power consumption requirements, may constrain an on-board GNSS receiver system to use as little battery power as possible to acquire and track a signal. Extended coherent integration provides a partial remedy to all four cases.

SUMMARY

Techniques for determining extended coherent integration intervals based on information about user activity, dynamics and clock stability are described. The extended coherent integration intervals may vary according to the information. Dynamically extending the coherent integration interval increases the signal-to-noise ratio during signal acquisition and tracking, thereby providing a benefit when antenna gain is poor, in weak signal conditions, and when being jammed or experiencing interference, or when power needs to be conserved, compared to extending the coherent integration interval for a fixed amount of time.

The features described in this specification can achieve one or more advantages. For example, a mobile device implementing the dynamic coherent integration techniques can compensate for interference that user-caused acceleration may have on location determination. The techniques can provide for degradation in SNR by less than 1 dB for constant acceleration up to two g's (19.6 m/s$^2$) for up to one second of coherent integration during pedestrian motion, even when the device is handheld or worn on the wrist. A mobile device implementing the dynamic coherent integration techniques can accommodate variances in an oscillator due to oscillator construction or aging and reduce location errors caused by the varying oscillator output. A mobile device implementing the dynamic coherent integration techniques can save power without sacrificing location accuracy by adjusting coherent integration time based on priorities of power conservation.

The details of one or more implementations of the subject matter are set forth in the accompanying drawings and the description below. Other features, aspects and advantages of the subject matter will become apparent from the description, the drawings and the claims.

BRIEF DESCRIPTION OF THE DRAWINGS

Like reference symbols in the various drawings indicate like elements.

DETAILED DESCRIPTION

GNSS Receiver Architecture

Figure 1:
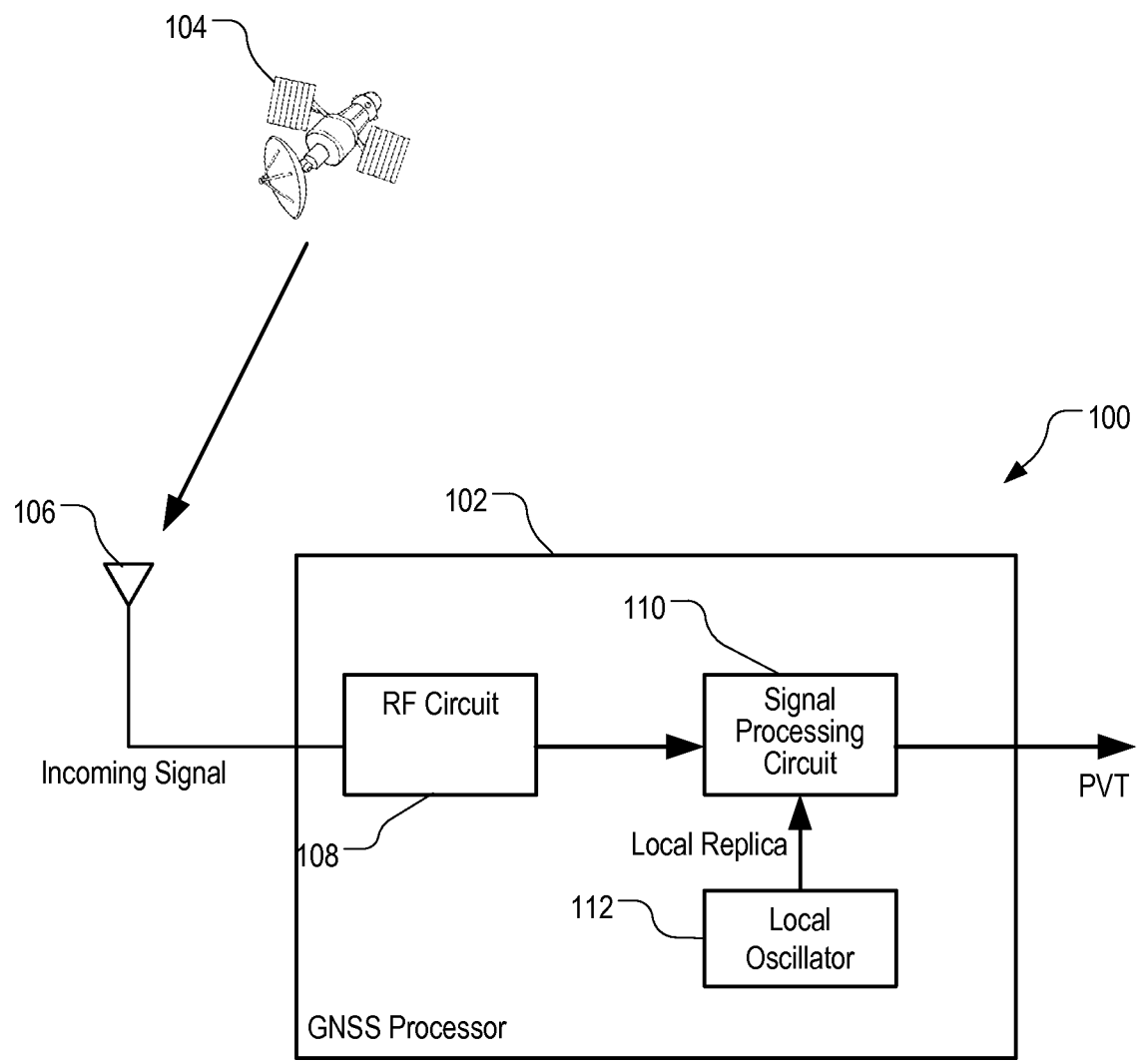
FIG. 1 is a block diagram illustrating an example conventional GNSS receiver system.

FIG. 1 is a block diagram illustrating an example conventional GNSS receiver system 100. GNSS receiver system 100 can include GNSS processor 102. GNSS processor 102 can be a processor configured to determine a geographic location from signals received from GNSS satellites 104. GNSS processor 102 can include, or be coupled to, antenna 106. Antenna 106 can be configured to receive radio frequency (RF) signals from GNSS satellites 104, and feed the received RF signals to RF circuit 108. RF circuit 108 can include circuit for preprocessing RF signals. For example, RF circuit 108 can include a low-noise amplifier (LNA) for amplifying the RF signals from antenna 106 and provide the amplified signals to signal processing circuit 110.

Signal processing circuit 110 can include analog and digital components. For example, signal processing circuit 110 can include down converter configured to convert the RF signals to intermediate frequency (IF) signals, an analog-to-digital converter to determine data bits from the IF signals, and one or more processors for determining satellite positions, pseudo-ranges and receiver positions. Signal processing circuit 110 can generate receiver position, velocity and time (PVT) as output.

Signal processing circuit 110 can mix input RF signals with signals from local oscillator 112. Local oscillator 112 can be a component of GNSS processor 102 or an external system coupled to GNSS processor 102 configured to generate a local replica for the down convertor of signal processing circuit 110. Signal processing circuit 110 can perform coherent integration over a period of time to improve SNR. The duration of coherent integration is sometimes known as coherent integration interval. The coherent integration interval is typically no longer than the duration of a data bit. For example, for a GPS processor, the coherent integration interval can be set to 20 milliseconds (ms).

Figure 2:
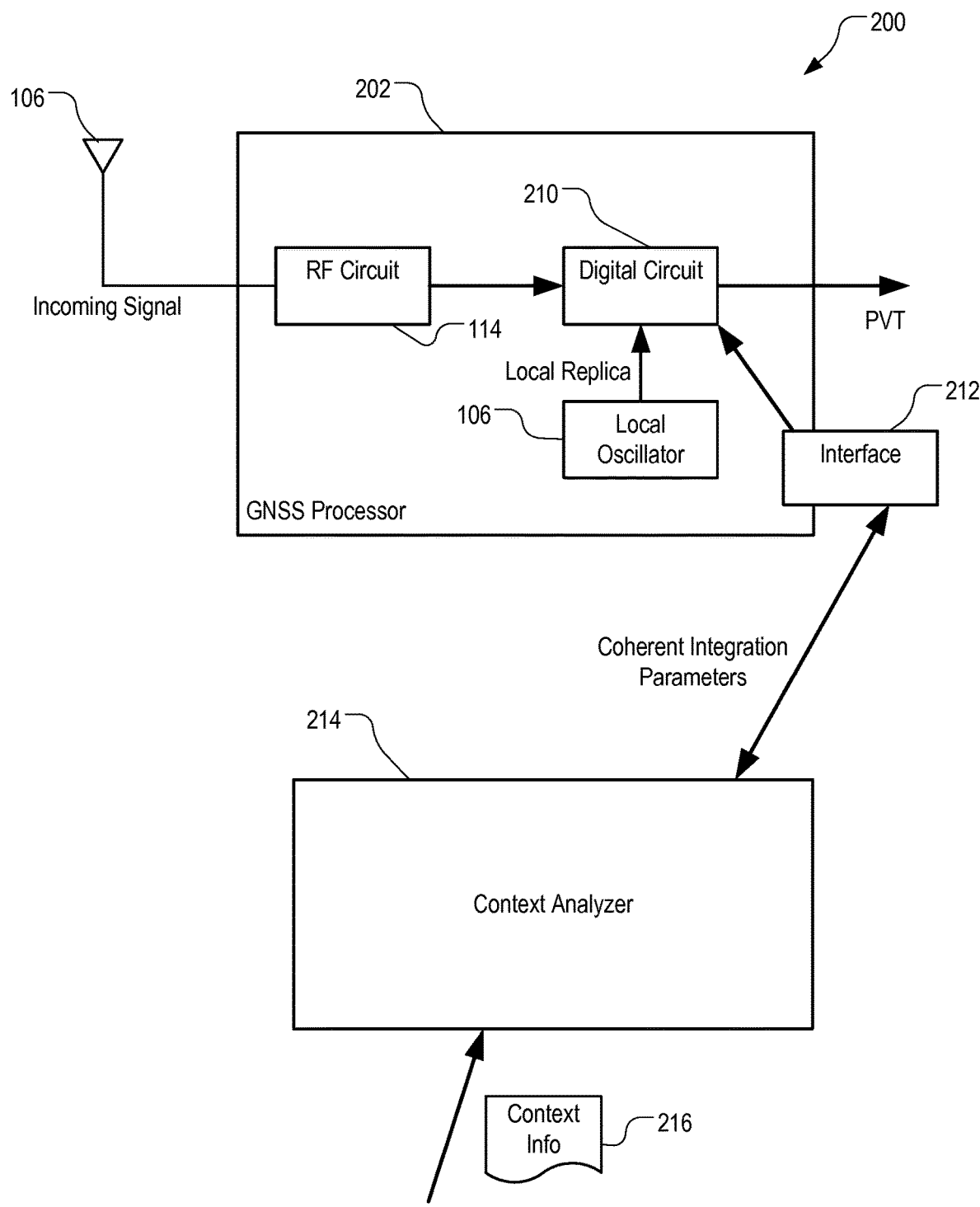
FIG. 2 is a block diagram illustrating an example GNSS receiver system implementing dynamic coherent integration.

FIG. 2 is a block diagram illustrating an example GNSS receiver system 200 implementing dynamic coherent integration. GNSS receiver system 200 can include GNSS processor 202. GNSS processor 202 can be a processor (e.g., a global positioning system (GPS) microchip) configured to determine a location from signals received from GNSS satellites. GNSS processor 202 can include, or be coupled to, antenna 106. GNSS processor 202 can include RF circuit 108. RF circuit 108 can amplify the RF signals from antenna 106 and provide the amplified signals to signal processing circuit 210. The amplified signals may be real or complex. During coherent integration, signal processing circuit 210 can mix the amplified signals with a complex sinusoid. Signal processing circuit 210 can perform coherent integration over a coherent integration interval that may change according to context.

Signal processing circuit 210 can perform functions of signal processing circuit 110. In addition, signal processing circuit 210 can dynamically adjust coherent integration interval according to various parameters of location calculation according to signals provided by interface 212. The parameters can include, for example, coherent integration interval, predicted data bit value and probability of the prediction being true. The parameters can include carrier frequency, which may shift from the frequency of signals broadcast from satellites.

Interface 212 can include hardware and software components for receiving the coherent integration interval and other parameters from context analyzer 214. Context analyzer 214 can include an electronic circuit configured to receive context information 216, determine the coherent integration interval and other parameters for location calculation, and provide the coherent integration interval and other parameters to GNSS processor 202 through interface 212. In some implementations, context analyzer 214 can be built into GNSS processor 202.

Context information 216 can include information on various factors that may affect the function of GNSS processor 202. For example, context information 216 can include sensors readings indicating user dynamics that cause GNSS processor 202 to accelerate in various directions that may cause frequency shift in detected GNSS signals. For example, when uncompensated user accelerations exceed an equivalent fraction of wavelength of a carrier wave during integration interval, coherent gain may decrease. In addition, context information 216 can include clock dynamics that may affect the accuracy of the local replica. For example, when uncompensated receiver clock accelerations exceed an equivalent fraction of wavelength of a carrier wave during integration interval, coherent gain may decrease. Context analyzer 214 can counter these effects based on context information 216.

To counter the effects, context analyzer 214 can determine a maximum coherent integration interval based on the user dynamics and clock dynamics. In addition, context analyzer can determine a coherent integration interval under the maximum for use by GNSS processor 202. Context analyzer 214 can model the user dynamics and clock dynamics a priori or detect these dynamics in situ. Context analyzer 214 can then provide the coherent integration interval to GNSS processor 202 to compensate for the dynamics and minimize degradation of the coherent gain.

Context analyzer 214 can use knowledge, prediction, and estimation of data bits carried by the satellite signals to extend a coherent integration interval beyond a nominal data bit interval (e.g., 20 ms for GPS). In particular, context analyzer 214 can predict the data bits for a duration that is longer than the nominal data bit interval. Context analyzer 214 can make the prediction based on various assumptions, including, for example, the assumption that the ephemerides change at regular cadences (e.g., once every two hours for GPS). Context analyzer 214 can associate various probability values with the predictions indicating a respective probability that each of the predictions is correct. For example, context analyzer 214 can associate a value of 100% for a predicted data bit value for GNSS system time, and a value of less than 100% for a predicted data bit value for data indicating satellite health.

Context information 216 can include one or more environment settings or attributes. These settings and attributes can include, for example, power consumption requirements, location quality requirements, performance level requirements or any combinations of the above. Context analyzer 214 can modify operations used for GNSS signal acquisition, signal tracking, signal observable measurement to meet the environment settings or attributes. Modifying the operations to meet the environment settings or attributes can result in benefits including, for example, improved signal sensitivity, improved observable quality for a given power consumption level, reduced power consumption for a given sensitivity or observable quality, or lower hardware size or cost requirement for a given level of performance requirement.

Context information 216 can include location information indicating an approximate geographic area where a mobile device hosting GNSS processor 202 is located. Context analyzer 214 can adjust coherent integration intervals of GNSS processor 202 of a mobile device based on the location information. The adjustment can reduce power consumption for a given level of location determination performance. For example, context analyzer 214 can reduce coherent integration interval upon determining that the mobile device is located in an area where GNSS signals are known or predicted to be strong (e.g., in open fields). Likewise, context analyzer 214 can increase coherent integration interval upon determining that the mobile device is located in an area where GNSS signals are known or predicted to be weak (e.g., in urban canyons). By adjusting the coherent integration interval, context analyzer 214 can minimize resource consumption for acquiring and tracking GNSS signals.

Context information 216 can include user activity information indicating device movement. Context analyzer 214 can adjust coherent integration intervals of GNSS processor 202 of a mobile device based on the user activity information. For example, context analyzer 214 can increase coherent integration interval upon determining that the user is performing an activity (e.g., sitting) in which the mobile device is substantially stationary. Context analyzer 214 can reduce the coherent integration interval upon determining that the user is performing an activity (e.g., running) in which the mobile device is moving or accelerating.

Additional details of dynamic coherent interaction are described below.

Figure 3:
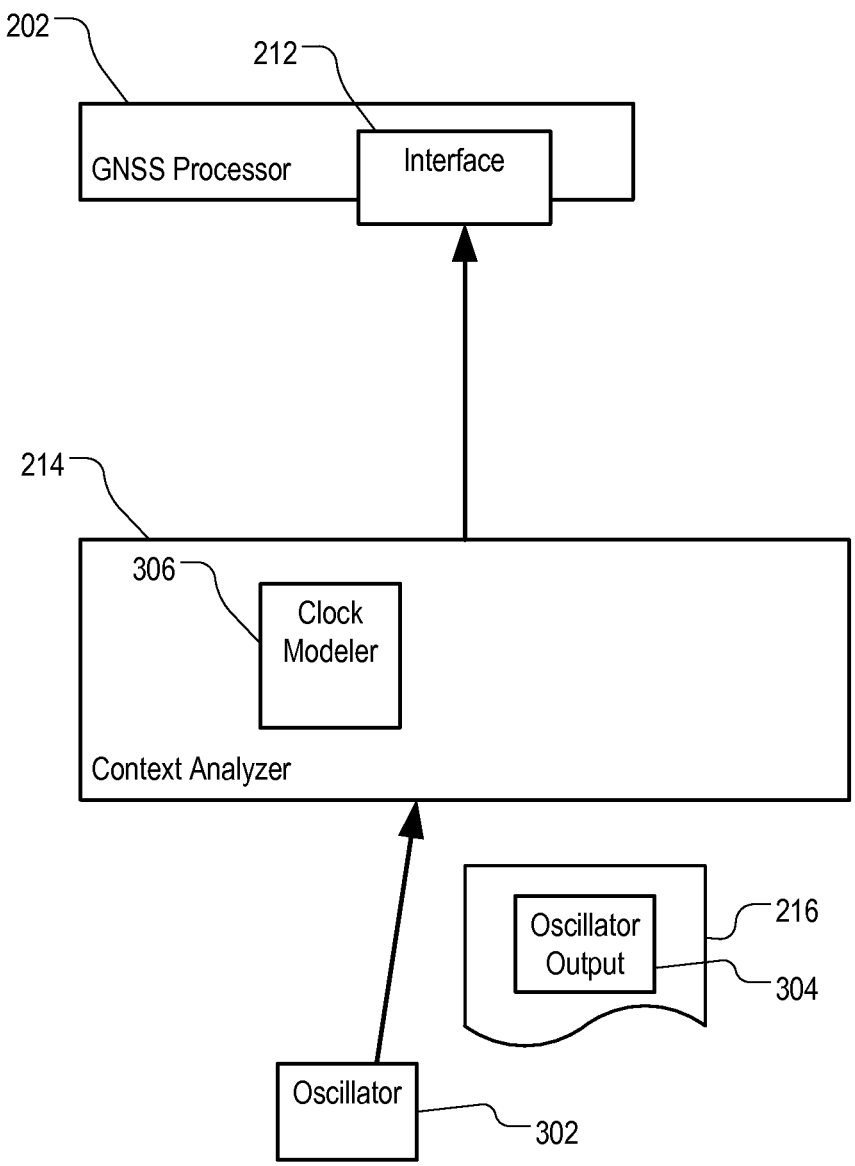
FIG. 3 is a block diagram illustrating example techniques of determining maximum coherent integration interval based on oscillator stability.

FIG. 3 is a block diagram illustrating example techniques of determining maximum coherent integration interval based on oscillator stability. Oscillator 302 can be an integrated or on-board local oscillator that drives RF and digital radio electronics in a mobile device, including RF circuit 114 and digital circuit 210 of FIG. 2. In various implementations, one or more of pseudorange, pseudorange rate, carrier Doppler shift and carrier phase measurements used for determining PVT can be derived from the local replica generated based on oscillator 302. Accordingly, stability of oscillator 302 can affect signal acquisition and tracking, affect the pseudorange and rate measurements, and affect accuracy of the PVT.

Each individual oscillator can have a particular stability. Oscillator 302 can have a stability that provides a certain ability to keep track of time to a particular accuracy over different time intervals. The stability of oscillator 302 can be a function of design, quality or age of oscillator 302. The stability can be affected by temperature, forces exerted on oscillator, or other factors. The stability can limit the coherent integration interval. Context analyzer 214 can determine the maximum coherent integration interval, which is an upper bound of coherent integration interval as limited by the stability.

In coherent integration, the complex sinusoid that mixes with the incoming real or complex signal may be required to be stable during the integration time interval to better than approximately one radian (57.2 degrees). The complex sinusoid can be derived directly from oscillator 302. Accordingly, stability of oscillator 302 may correspond directly to stability in the complex sinusoid.

Context information 216 can include oscillator output 304 that is originated from oscillator 302. Context analyzer 214 can include clock modeler 306. Clock modeler 306 is a component of context analyzer 214 configured to measure and represent stability of oscillator 302 based on oscillator output 304. Clock modeler 306 can model stability of oscillator 302 using oscillator phase noise spectral density. The oscillator phase noise spectral density can represent phase noise at different frequencies for the complex sinusoid. Alternatively, clock modeler 306 can represent oscillator stability using Allan variance (AVAR), Allan deviation (ADEV), or both.

The Allan variance can represent a two-point stability of oscillator 302 over an interval of interest. Clock modeler 306 can use Allan variance data for determining an upper bound on a coherent integration interval. Clock modeler 306 can define a real-valued sine wave voltage output of oscillator 302 using equation (1) below.

$$V(t) = V_0 \cos[2\pi v_0 \cdot t + \phi(t)], \tag{1}$$

where V(t) is a real-valued sine wave voltage output of oscillator 302 over time t, $V_0$ is the signal amplitude in volts, $v_0$ is the oscillator frequency in Hertz (Hz), and $\phi(t)$ is a random process characterizing the phase departure from a perfect sine wave.

Clock modeler 306 can determine instantaneous frequency v(t) as a derivative of the argument of equation (1) divided by $2\pi$, as shown in equation (2).

$$v(t) = v_0 + \frac{1}{2\pi} \frac{d}{dt} \phi(t) \tag{2}$$

Clock modeler 306 can determine instantaneous fractional frequency deviation y(t) as follows.

$$y(t) = \frac{1}{2\pi v_0} \frac{d}{dt} \phi(t) \tag{3}$$

Clock modeler 306 can use the instantaneous fractional frequency deviation y(t) to determine an average fractional frequency deviation over an interval $\tau$ as follows, in equation (4).

$$\bar{y}_k = \frac{1}{\tau} \int_{t_k}^{t_k + \tau} y(t) \, dt, \tag{4}$$

where $\bar{y}_k$ is the fractional frequency deviation for given time period k, $t_k$ is the beginning time of time period k, and $\tau$ is the interval, which will be designated as $\tau_{coh,osc}$ to distinguish over coherent integration intervals related to other factors (which will be described further).

From the fractional frequency deviation, clock modeler 306 can determine the Allan variance for oscillator 302 using equation (5) as follows.

$$\sigma_y^2(\tau_{coh,osc}) = \left\langle \frac{(\bar{y}_{k+1} - \bar{y}_k)^2}{2} \right\rangle, \tag{5}$$

where $\sigma_y^2(\tau_{coh,osc})$ is the Allan variance over interval $\tau_{coh,osc}$, $\bar{y}_k$ is the fractional frequency deviation for given time epoch k, and $\bar{y}_{k+1}$ is the fractional frequency deviation for given time epoch k+1.

Clock modeler 306 can then use the AVAR and/or ADEV to approximate a maximum time that oscillator 302 can support coherent integration using condition (6) below.

$$2\pi v_0 \sigma_y(\tau_{coh,osc}) \approx X \text{ radians}, \tag{6}$$

where $\sigma_y(\tau_{coh,osc})$ is the Allan deviation ADEV, which is a square root of the Allan variance AVAR as determined using equation (5), $v_0$ is the oscillator frequency in Hz, and X is a configurable number that limits the time. When X is set to one, the limit is a 0.36-dB limit causing 0.36 dB of power to be lost in the SNR. Clock modeler 306 can solve for $\tau_{coh,osc}$ which corresponds to an approximate maximum coherent integration interval for oscillator 302.

The above equations are being provided as an example for determining maximum coherent integration time related to stability of oscillator 302. Other formulations are possible. For example, clock modeler 306 can convert Allan variance to oscillator phase power spectral density and vice versa. Accordingly, clock modeler 306 can calculate the coherent integration interval or maximum coherent integration interval from either the Allan variance or the phase power spectral density.

Oscillator 302 may be designed to use radio signals (e.g., cellular signals) to calibrate time and frequency. This design can improve oscillator stability, which may extend the maximum coherent integration interval. Oscillator 302 may not include an oven or inherent temperature control compensation. During temperature ramps, oscillator 302's frequency may change. Clock modeler 306 may use laboratory calibration of frequency response of oscillator 302 as a function of temperature along with an on-board or external thermistor to improve stability of oscillator 302 in a temperature-varying environment. In various implementations, the function of improving the stability using laboratory calibration can be performed by clock modeler 306, oscillator 302 or both.

Figure 4:
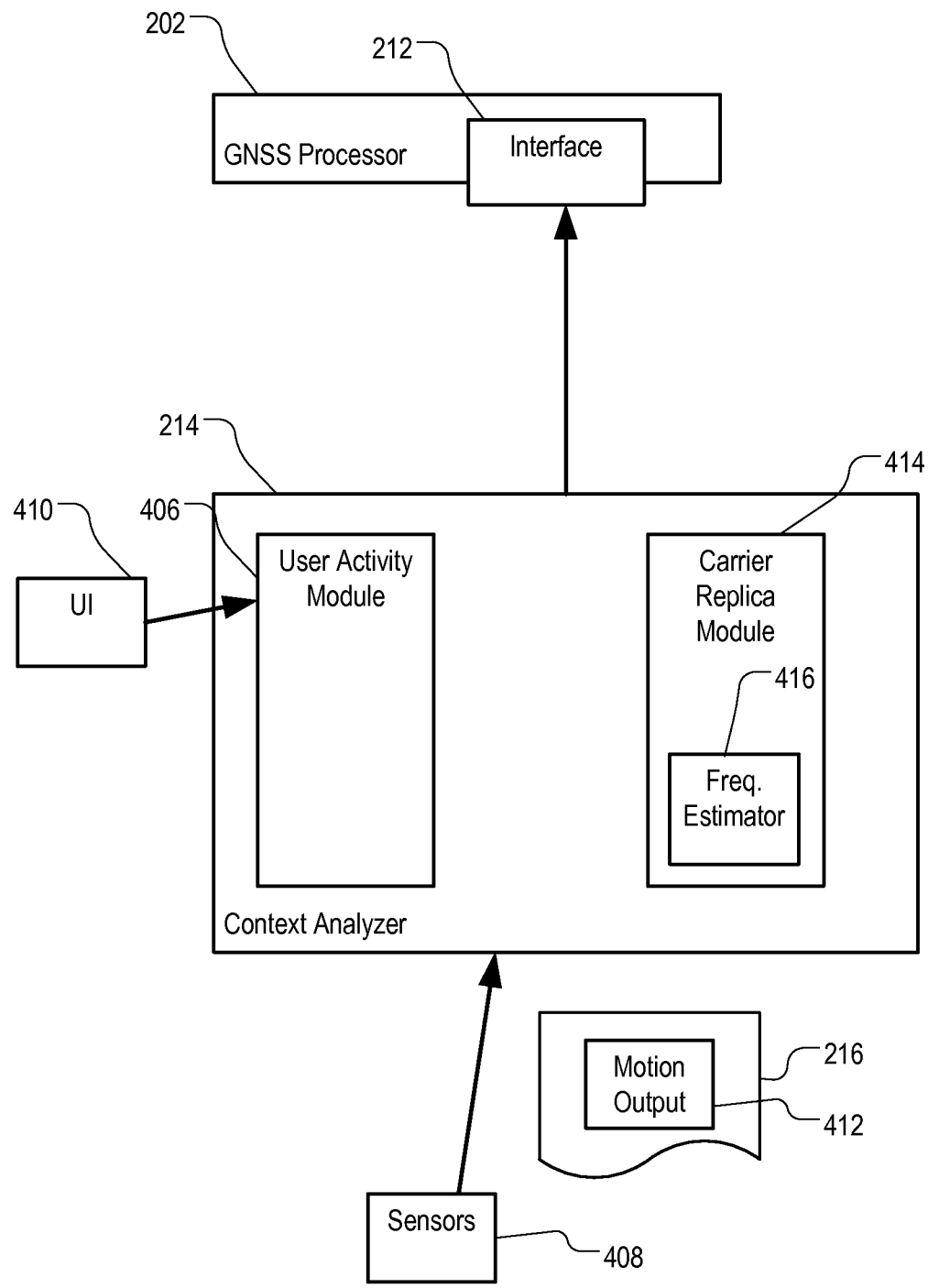
FIG. 4 is a block diagram illustrating example techniques of determining maximum coherent integration interval based on user dynamics.

FIG. 4 is a block diagram illustrating example techniques of determining maximum coherent integration interval based on user dynamics. The user dynamics can include motion of GNSS processor 202 caused by user actions with a mobile device on which GNSS processor 202 is installed. Context analyzer 214 can be configured to determine maximum coherent integration interval that is an upper bound of coherent integration interval as limited by the user dynamics. The upper limit can compensate for user dynamics including, for example, constant acceleration, jerks or both. Constant acceleration can include acceleration that is constant over time. For example, a GNSS receiver can experience constant acceleration when being carried in a car going around a curve of constant radius, or carried by a runner accelerating during a sprint, e.g., in a fanny pack. A jerk can be caused by a time rate of change of acceleration. For example, a GNSS receiver can experience a jerk when being dropped on the ground, or carried by a runner accelerating during a sprint, e.g., in hand.

Context analyzer 214 can extend coherent integration without significantly degrading SNR by using various strategies. These strategies can include, for example, determining or estimating a user activity type and device placement; using signal processing techniques that minimize effects of the acceleration and jerk; performing extended coherent integration during intervals of time only when acceleration and jerk are known to be minimal, or any combination of the above.

Context analyzer 214 can include user activity module 406. User activity module 406 is a component of context analyzer 214 configured to determine maximum coherent integration interval based on user activity type and device placement. User activity module 406 can determine a user activity type from one or more sensors 408 of the mobile device or by direct user input through user interface 410. Examples of user activity types determined by user activity module 406 can include driving, walking, running, cycling, swimming or stationary.

Sensor 408 can provide sensor output 412 usable by user activity module 406 to determine a user activity type. Sensors 408 can include, for example, GNSS receivers, Wi-Fi™ radios, Bluetooth™ radios, cellular radios, other radio transceivers, accelerometers, gyroscopes, magnetometers, barometers, optical cameras, or microphones. User activity module 406 can classify a user activity type by measuring relative or absolute motion of the device. For example, user activity module 406 can determine that a measured velocity between X meters per second and Y meters per second indicates a "driving" activity type. User activity module 406 can classify a user activity type by executing machine-learning routines to learn what signatures from sensors are associated with what type of activities.

User activity module 406 can determine a manner the mobile device is being held (e.g., hand-held or worn on body) or a placement of the mobile device. The placement can be a location where the mobile device is mounted or placed on a human body (e.g., on wrist, on belt, or on arm). User activity module 406 can use the manner or placement to complement the activity type. For example, user activity module 406 can use the manner or placement to determine activity types including running, walking, cycling, swimming or other physical and athletic activities. User activity module 406 can use estimated or known device placement on a human body to help bound types of accelerations and jerks present.

For example, user activity module 406 can determine that the mobile device is hand-held while a user activity type is walking In response, user activity module 406 can then determine that the mobile device may experience an acceleration having a first limit, e.g., acceleration of up to two g's (19.6 m/s$^2$). The first limit can be determined using a lookup table or by learning. By comparison, user activity module 406 can determine that the mobile device is located in a back pocket while a user activity type is walking In response, user activity module 406 can then determine that the mobile device may experience an acceleration having a second limit, e.g., acceleration of up to 0.5 g's (5 m/s$^2$). In a case of maximum acceleration, user activity module 406 can determine that the mobile device (which can be a wearable device) is located on a wrist or ankle, and that the user activity type is a sprint. User activity module 406 can then determine that the mobile device may experience an acceleration having a third limit, e.g., acceleration of up to 12 g's (117.6 m/s$^2$).

User activity module 406 can determine that user dynamics corresponding to higher acceleration corresponds to a shorter maximum coherent integration interval. For example, user activity module 406 can determine that a longer coherent integration interval can be used when the device is located at a location (e.g., in a pocket) that is subject to less acceleration (e.g., compared to in a hand, on a wrist, or on an ankle).

User activity module 406 can bound the maximum coherent integration interval using the uncompensated acceleration using condition (7) below.

$$\frac{2\pi \delta a \cdot \tau_{coh,dynamics}^2}{\lambda} \approx X \text{ radians,} \quad (7)$$

where $\delta a$ is the uncompensated constant acceleration, $\tau_{coh,dynamics}$ is the coherent integration interval related to user dynamics, $\lambda$ is the wavelength of the GNSS signal of interest, and X is a configurable number that limits the time, as set forth above in condition (6). User activity module 406 can solve for $\tau_{coh,dynamics}$ to determine the maximum coherent integration interval related to user dynamics. User activity module 406 can use a similar condition to solve maximum coherent integration interval for a jerk.

Context analyzer 214 can include carrier replica module 414. Carrier replica module 414 is a component of context analyzer 214 configured to compensate for effects of acceleration on coherent integration. Some conventional GNSS receivers use non-coherent integration to limit the effects of accelerations and jerks. The dynamic coherent integration technology described here can achieve the same SNR as non-coherent integration can in shorter duration and therefore with less power consumption.

To compensate for acceleration, carrier replica module 414 can determine a complex carrier replica using, for example, formulation (8) below.

$$S_{carrier,k} = \cos(2\pi f_0 \cdot t + 2\pi \dot{f}_0 \cdot t^2) + j \cdot \sin(2\pi f_0 \cdot t + 2\pi \dot{f}_0 \cdot t^2), \quad (8)$$

where $S_{carrier,k}$ is carrier replica at time period k, $f_0$ is a constant carrier frequency, and $\dot{f}_0$ is a constant carrier frequency rate. A related formulation in the frequency domain can include using discrete transform techniques with basis functions that are sinusoids having argument (9) below.

$$2\pi f_0 \cdot t + 2\pi \dot{f}_0 \cdot t^2, \quad (9)$$

where $f_0$ is a constant carrier frequency, and $\dot{f}_0$ is a constant carrier frequency rate. Alternatively, carrier replica module 414 can use a two-stage Fast-Fourier Transform (FFT) operations, where a first stage estimates the constant frequency and the second stage estimates the constant acceleration.

In some implementations, carrier replica module 414 can include frequency estimator 416. Frequency estimator 416 is a component configured to break a single coherent integration into multiple short sub-accumulations each having a duration of microseconds to milliseconds during which effects of accelerations or jerks are insignificant. Frequency estimator 416 can then determine frequency and frequency rate of incoming signals based on the sub-accumulations. Carrier replica module 414 can receive, as input, each complex sub-accumulation and a current data bit value. Carrier replica module 414 can designate an initial phase, initial phase rate and initial phase acceleration during the coherent integration as a state vector. Carrier replica module 414 can then sum the sub-accumulations together to generate a single coherent integration, which can result in a higher SNR.

Figure 5:
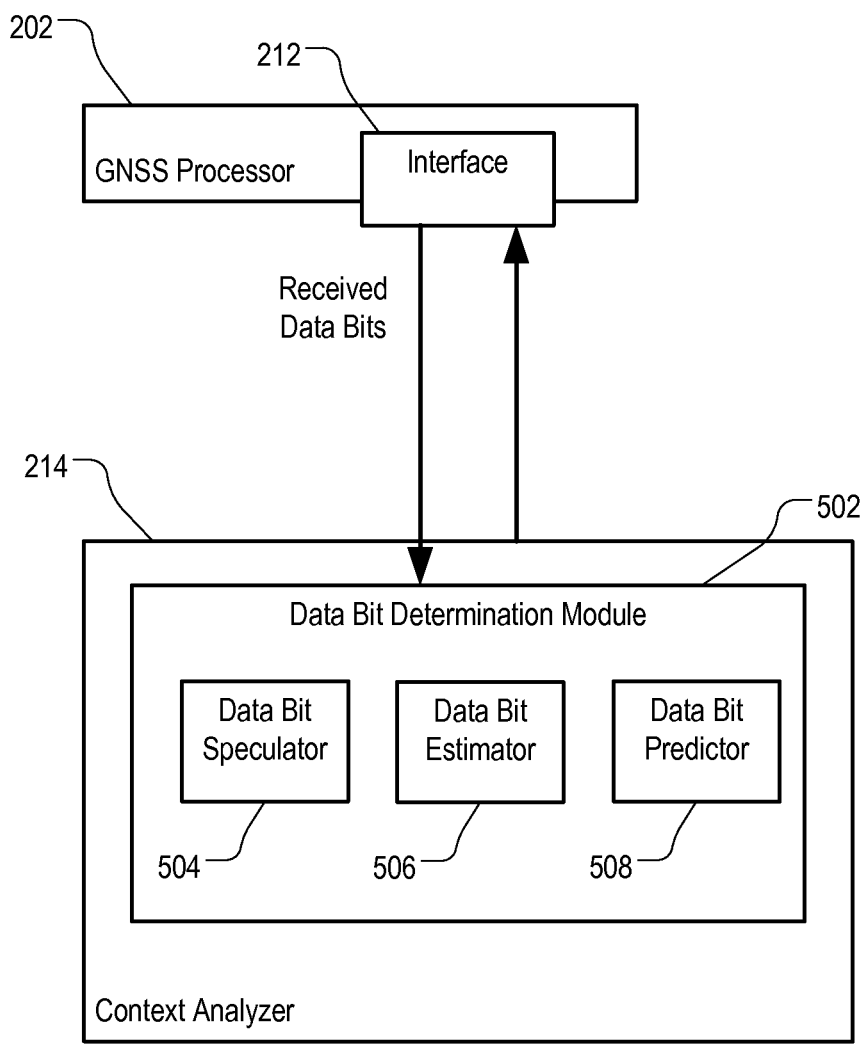
FIG. 5 is a block diagram illustrating example techniques of determining data bits for extended coherent integration.

FIG. 5 is a block diagram illustrating example techniques of determining data bits for extended coherent integration. Conventional coherent integration interval is limited in duration to the length that a data bit is transmitted, which can be 2-20 ms for a modern GNSS system. Context analyzer 214 can include data bits determination module 502, which can determine a future data bit that has not been received yet. Determining a future data bit allows for extended coherent integration. In extend coherent integration, a coherent integration interval can extend beyond the duration of a single data bit.

GNSS processor 202 may receive GNSS signals including a low-rate (e.g., 50-100 Hz) data bit signal modulated on a carrier waveform. The data bits are sometimes called navigation data. The navigation data transmitted from a satellite can include information about the transmitting satellite and the constellation of navigation satellites in the GNSS as a whole. The information can include, for example, satellite ephemeris, satellite clock, satellite constellation almanac, satellite health and other information.

In the signals received by GNSS processor 202, data bits modulation can be bi-phase shift keying (BPSK), quad-phase shift keying (QPSK) or other modulation technology. These types of modulations may be implemented as phase changes in the carrier waveform of ±180 degrees in BPSK or ±90 degrees in QPSK. These phase changes to the carrier waveform may cause degradation of SNR for coherent integration intervals longer than the duration of a data bit. Context analyzer 214 can include data bit determination module 502. Data bit determination module 502 is a component of context analyzer 214 configured to determine data bits to allow coherent integration to span multiple data bits temporally.

Data bit determination module 502 can include data bit speculator 504, data bit estimator 506, data bit predictor 508, or any combination of the above. Data bit speculator 504 is a component of data bit determination module 502 configured to guess data bits beyond a given first bit. Number of data bits guessed by data bit speculator 504 can be modeled using equations (10) and (11) below.

For BPSK:

$$N_{bits,BPSK}=2^{ceil(t_{coh}/t_{databit})}-1; \quad (10)$$

and for QPSK:

$$N_{bits,QPSK}=2^{2\cdot ceil(t_{coh}/t_{databit})}-1; \quad (11)$$

where $N_{bits,BPSK}$ is the number of bits to guess for BPSK signals, $N_{bits,QPSK}$ is the number of bits to guess for QPSK signals, $t_{coh}$ is the coherent integration interval of interest and $t_{databit}$ is the duration of the data bit sequence.

Data bit speculator 504 can limit the exponential growth in the number of possible data bit combinations that a particular sequence of data bits can have by limiting extension of the coherent integration to a duration of less than X (e.g., 1000) ms. For example, GNSS processor 202 may be configured to receive and process GPS signals, which have a 20-ms nominal data bit interval. Data bit speculator 504 can set the extended coherent integration interval of ten times the nominal data bit interval (200 ms). The 200 ms interval results in 512 different possible sequences of data bits. Data bit speculator 504 can hypothesize each of the 512 combinations of data bits. Data bit speculator 504 can process the in-phase and quadrature accumulations for all combinations at various code phase grid spacings and carrier Doppler shift frequency grid spacings. In some implementations, data bit speculator 504 can prune the exemplar 512 combinations during the coherent integration process to remove small-magnitude accumulations. The pruning can reduce a total memory footprint, a size of an ASIC, or both.

Data bit speculator 504 can then hypothesize each possible data bit sequence. Data bit speculator 504 can sum up a vector product of the accumulations and data bit sequences to produce different bins containing complex values equal to the number of possible data bit sequences. In some implementations, data bit speculator 504 can designate a bin having the largest absolute value above a detection threshold as a bin containing the correct sequence of data bits. In some implementations, data bit speculator 504 can perform constrained optimization, wherein impossible combinations of data bits, including combinations of data bits that would result in invalid decoding, are explicitly removed, even when these combinations correspond to high signal power. In performing the constrained optimization, data bit speculator 504 can apply a modified Viterbi algorithm. A hardware processor can be programmed to perform the bookkeeping and processing operations of data bit speculator 504.

Data bit estimator 506 is a component of data bit determination module 502 configured to estimate a data bit sequence that occurs during an extended coherent integration interval. Data bit estimator 506 can estimate a data bit sequence using various data bit detecting strategies, Bayesian, and non-Bayesian approaches including maximum-likelihood, maximum a-posteriori estimators, or other methods. For example, data bit estimator 506 can estimate the individual data bits over each data bit interval using a standard bit detection algorithm. In some implementations, data bit estimator 506 can include a maximum likelihood estimator for maximizing a function $Z_{databits}$ as defined in equation (12) below.

$$Z_{databits}=\Sigma_{k=1}^{N}D_k(I_k+j\cdot Q_k), \quad (12)$$

where $D_k$ is the data bit value, $I_k$ is the prompt in-phase accumulation, and $Q_k$ is the prompt quadrature accumulation.

Data bit estimator 506 can maximize the function under the correct data bit sequence according to equation (13) below.

$$\hat{x}(Z_{databits}) = \underset{x}{\mathrm{argmax}}\left[\sum_{k=1}^{N} D_k(I_k + j\cdot Q_k)\right], \quad (13)$$

where x is the true sequence of data bit values, and $\hat{x}$ is the estimated sequence of data bit values.

In this implementation, data bit estimator 506 can assume that the in-phase and quadrature accumulations have their carrier Doppler shift frequency errors substantially removed.

Data bit estimator 506 can assume reliable code tracking Data bit estimator 506 can perform joint estimation of the data bit values along with either the code rate and carrier Doppler shift frequency or the carrier Doppler shift frequency. Data bit estimator 506 can also estimate signal amplitude, which can further improve the estimation accuracy, especially when the signal power in changing over time.

Data bit determination module 502 can include data bit predictor 508. Data bit predictor 508 is a component of data bit determination module 502 configured to predict one or more data bits from GNSS constellations that have data bit time histories that are repetitive. Data bit predictor 508 can predict data bits in a navigation message that typically remain the same over time, including, for example, the orbit, clock, status and other information over minutes or even hours. Data bit predictor 508 can predict data bits (e.g., time fields) in a navigation message that, although change frequently, but change in a predictable manner. Data bit predictor 508 can predict data bits that can change quickly but rarely, e.g., data bits representing satellite health and integrity information. For example, data bit predictor 508 can use a 12.5-minute time history of GPS bits from a GPS satellite to predict that satellite's future data bits for up to two hours. Data bit predictor 508 can apply various prediction strategies in predicting the data bits. The strategies can include, for example, assigning constant or variable values to estimated data bits. Data bit predictor 508 can use past information about a satellite including data bits of the satellite from a previous epoch and the physics of the satellite's orbit and clock.

Figure 6:
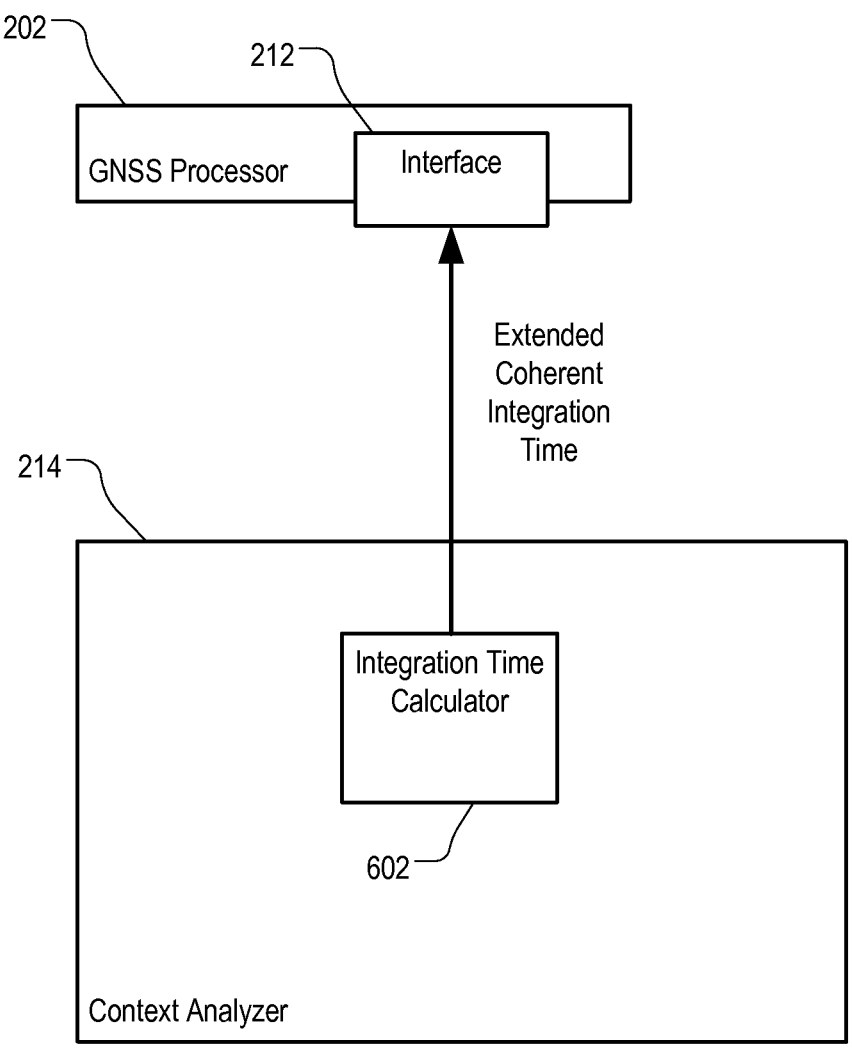
FIG. 6 is a block diagram illustrating example techniques of determining extended coherent integration time.

FIG. 6 is a block diagram illustrating example techniques of determining extended coherent integration time. Context analyzer 214 can include integration time calculator 602. Integration time calculator 602 is a component of context analyzer 214 configured to determine the duration of maximum coherent integration interval using the output of clock modeler 306, user activity module 406, carrier replica module 414, and data bit determination module 502 as described above in reference to FIGS. 3-5. The output can include maximum coherent integration intervals determined in various manners.

Integration time calculator 602 can determine the duration of maximum coherent integration interval using equation (14) below.

$$\tau_{coh,max} = \min(\tau_{coh,osc}, \tau_{coh,dynamics}, t_{databits}),  \quad (14)$$

where $\tau_{coh,max}$ is the duration of maximum coherent integration interval, $\tau_{coh,osc}$ is the maximum coherent integration interval based on the oscillator, also referred to as coherence time of the oscillator, $\tau_{coh,dynamics}$ is the maximum coherent integration interval based on the observed or estimated user activity, device location, or user and device dynamics, and $t_{databits}$ is the duration in which the data bits are known, predictable, or guessable. Integration time calculator 602 can provide $\tau_{coh,max}$ as extended coherent integration time to GNSS processor 202 through interface 212.

Optionally, integration time calculator 602 can provide to interface 212 inputs including start and stop times of the coherent integration interval (or midpoint and duration), the data bit values during the coherent integration interval, probabilities or weightings on the values of the data bits, the frequency to use for carrier wipe-off, and frequency rate to use for carrier wipe-off. Interface 212 can be external to GNSS processor 202, or be an internal interface including software executing on GNSS processor 202.

For convenience, clock modeler 306, user activity module 406 and carrier replica module 414, data bit determination module 502, and integration time calculator 602 are illustrated separately. In various implementations, context analyzer 214 can include any combination of these functional modules.

Exemplary Procedures

Figure 7:
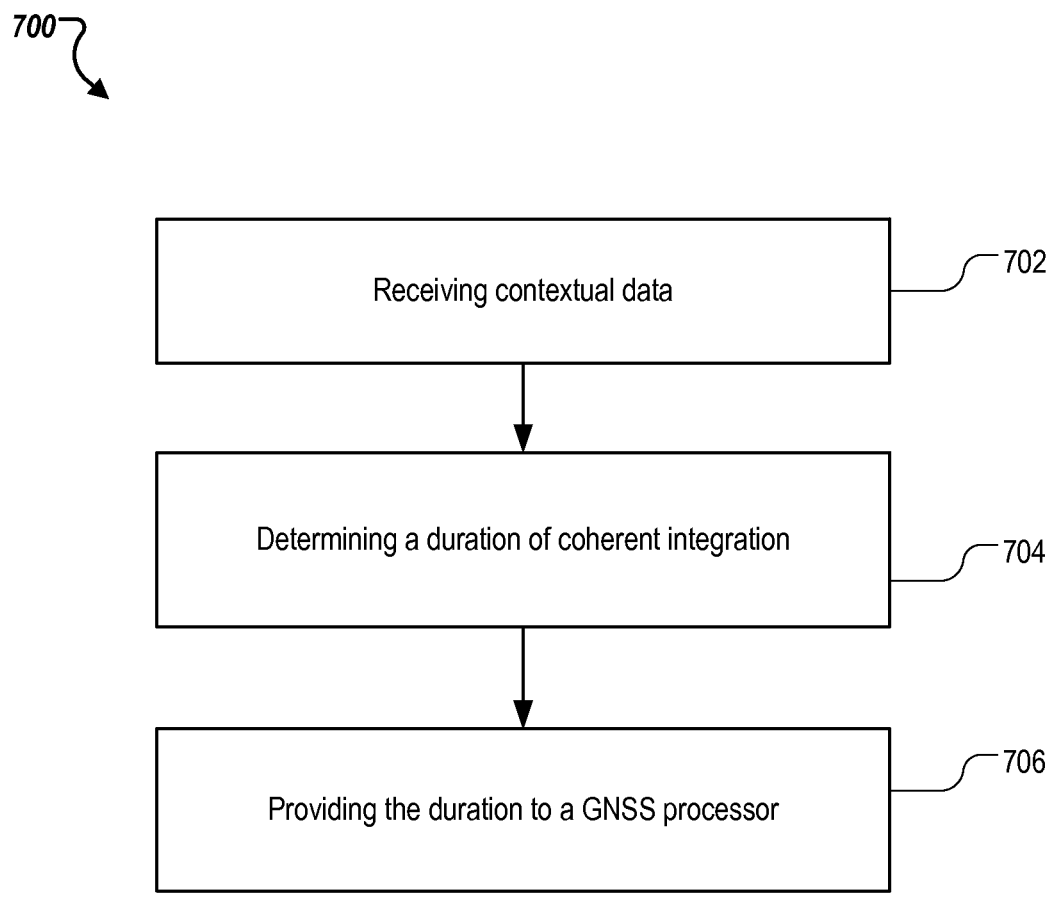
FIG. 7 is a flowchart of an example process of dynamic coherent integration.

FIG. 7 is a flowchart of example process 700 of dynamic coherent integration. Process 700 can be executed by a processor, e.g., a computer processor of a mobile device. The processor can be programmed to perform the functions of context analyzer 214 as described above in reference to FIGS. 2-6.

The processor can receive (702) contextual data. The contextual data can include information on factors that may affect coherent integration of an RF signal received by the mobile device. The RF signal can be a phase coherent signal. The RF signal can be a navigation or communication signal. The RF signal can be a signal from, for example, the Iridium™ system, a Wi-Fi™ system or a cellular communication system. The RF signal can be a time-bearing and range-bearing signal. The RF signal can be a GNSS signal. The RF signal can be any combination of the above. The contextual data can include information about movement of the mobile device determined from one or more sensors (e.g., gyroscopes or accelerometers) of the mobile device. The factors that may affect the coherent integration of the RF signal can include at least one of antenna efficiency, signal environment, jamming, or power consumption requirement.

For example, the contextual data can include a location of the mobile device, previously determined by an RF signal processor (e.g., a GNSS processor) of the mobile device or by a wireless location determination system of the mobile device. The contextual data can include a user activity type determined according to readings of one or more sensors of the mobile device. The contextual data can include device dynamics. The device dynamics can be a function of placement of the mobile device on a body of a user (e.g., on a wrist or in a pocket) and dynamics that the user is experiencing (e.g., running or cycling). The contextual data can include a-priori or real-time information on radio jamming. The information on radio jamming being provided by a radio frequency (RF) receiver of the mobile device. The contextual data can include an indicator on whether position performance is given a higher priority than a priority for power conservation. The processor can determine the priorities according to user input or according to device operating mode. The contextual data can include a measurement of efficiency of a GNSS antenna. The contextual data can include a measurement of oscillator stability.

The processor can determine (704) a coherent integration interval based on the contextual data. The duration is configured to compensate for effects of the factors on the coherent integration according to the information on the factors that may affect coherent integration.

For example, when the contextual data includes information about movement of the mobile device, determining the coherent integration interval can include shortening the coherent integration interval upon determining that a sensor of the device indicates that the device is in motion or lengthening the coherent integration interval upon determining that a sensor of the device indicates that the device is stationary. In some implementations, determining the coherent integration interval includes shortening or lengthening the coherent integration interval based on a magnitude of the movement. A greater magnitude of the movement corresponds to a shorter coherent integration interval.

When the contextual data includes a user activity type, determining the coherent integration interval can include shortening the coherent integration interval upon determining that the user activity type is a designated low-priority activity type (e.g., running, driving, or flying) or lengthening the coherent integration interval upon determining that the user activity type is a designated high-priority activity type (e.g., walking or cycling).

When the contextual data includes a location of the mobile device, determining the coherent integration interval can including shortening the coherent integration interval upon determining that the location is in an area designated as strong signal area (e.g., open field) or lengthening the coherent integration interval upon determining that the location is in an area designated as weak signal area (e.g., urban canyon). In some implementations, determining the coherent integration interval can further be based on multipath effects. For example, different coherent integration intervals can correspond to a strong signal area with multipath effect, a strong signal area without multipath effect, a weak signal area with multipath effect or a weak signal area without multipath effect. Determining the coherent integration interval can include shortening the coherent integration interval upon determining that the location is in an area where multipath effects are present or lengthening the coherent integration interval upon determining that the location is in an area where multipath effects are absent.

When the contextual data includes device dynamics, determining the coherent integration interval can include compensating for the device dynamics using readings of at least one of a gyroscope of the device, an accelerometer of the device, or a barometer, magnetometer or camera of the device. Compensating for the device dynamics can include compensating for angular or linear acceleration in addition to compensating for linear movement.

When the contextual data includes a-priori or real-time information on radio jamming or interference, determining the coherent integration interval can include determining a duration of the coherent integration interval sufficient to overcome the radio jamming or interference.

When the contextual data includes an indicator on whether position performance is given a higher priority than a priority for power conservation, determining the coherent integration interval can include maximizing the coherent integration interval only upon determining that the indicator indicates that the position performance is given a higher priority.

When the contextual data includes a measurement of efficiency of a GNSS antenna, determining the coherent integration interval can include using extended coherent integration to improve post-correlation sensitivity upon determining that the measurement fails to reach a threshold value.

When the contextual data includes a measurement of oscillator stability, determining the coherent integration interval can include designating a coherent time of the oscillator as the coherent integration interval. The coherent time can be the Allan deviation as described above in reference to condition (6).

The processor can provide (706) the coherent integration interval to a GNSS processor of the device for determining a location of the device by performing the coherent integration of the GNSS signal for the coherent integration interval. In some implementations, the processor can provide preloaded data bits, predicated data bits, or guessed database to the GNSS processor for determine the location. The coherent integration interval can be determined by designating a length of time of the preloaded data bits or a length of time during which the data bits are predictable or guessable as the coherent integration interval. In some implementations, the processor can model a signal that does not have data bits (e.g., a pilot signal) as a signal with a constant data bit value. Accordingly, the approaches described above, including using preloaded bits, predicted bits, or guessed bits, can be applied to a pilot signal or other similar signals having no data bits.

Exemplary Mobile Device Architecture

Figure 8:
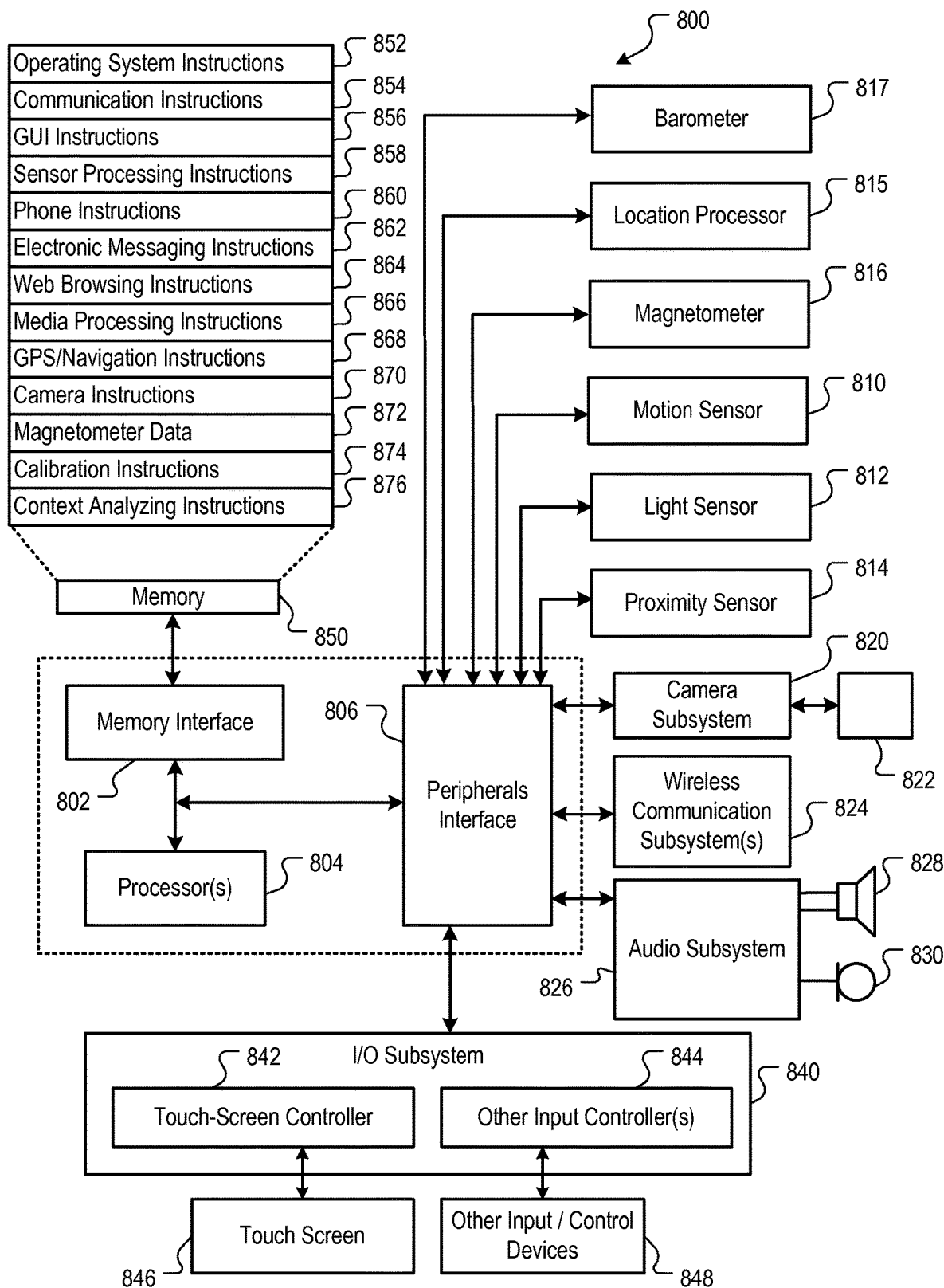
FIG. 8 is a block diagram illustrating an example device architecture of a mobile device implementing the features and operations described in reference to FIGS. 1-7.

FIG. 8 is a block diagram illustrating an exemplary device architecture 800 of a mobile device implementing the features and operations described in reference to FIGS. 1-10C. A mobile device can include memory interface 802, one or more data processors, image processors and/or processors 804 and peripherals interface 806. Memory interface 802, one or more processors 804 and/or peripherals interface 806 can be separate components or can be integrated in one or more integrated circuits. Processors 804 can include application processors, baseband processors and wireless processors. The various components in the mobile device, for example, can be coupled by one or more communication buses or signal lines.

Sensors, devices and subsystems can be coupled to peripherals interface 806 to facilitate multiple functionalities. For example, motion sensor 810, light sensor 812 and proximity sensor 814 can be coupled to peripherals interface 806 to facilitate orientation, lighting and proximity functions of the mobile device. Location processor 815 can be connected to peripherals interface 806 to provide geopositioning. In some implementations, location processor 815 can be program to perform the operations of GNSS processor 202 or context analyzer 214 or both. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Motion sensor 810 can include one or more accelerometers configured to determine change of speed and direction of movement of the mobile device. Barometer 817 can include one or more devices connected to peripherals interface 806 and configured to measure pressure of atmosphere around the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a GPRS network, an EDGE network, a Wi-Fi™ or WiMax™ network and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording and telephony functions. Audio subsystem 826 can be configured to receive voice commands from the user.

I/O subsystem 840 can include touch surface controller 842 and/or other input controller(s) 844. Touch surface controller 842 can be coupled to a touch surface 846 or pad. Touch surface 846 and touch surface controller 842 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 846. Touch surface 846 can include, for example, a touch screen.

Other input controller(s) 844 can be coupled to other input/control devices 848, such as one or more buttons, rocker switches, thumb-wheel, infrared port, USB port and/or a pointer device such as a stylus. The one or more buttons (not shown) can include an up/down button for volume control of speaker 828 and/or microphone 830.

In one implementation, a pressing of the button for a first duration may disengage a lock of the touch surface 846; and a pressing of the button for a second duration that is longer than the first duration may turn power to the mobile device on or off. The user may be able to customize a functionality of one or more of the buttons. The touch surface 846 can, for example, also be used to implement virtual or soft buttons and/or a keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 802 can be coupled to memory 850. Memory 850 can include high-speed random access memory and/or non-volatile memory, such as one or more magnetic disk storage devices, one or more optical storage devices and/or flash memory (e.g., NAND, NOR). Memory 850 can store operating system 852, such as iOS, Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Location instructions 868 to facilitate generic GNSS and location-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can store context analyzing instructions 876 that, when executed by processor 804, can cause processor 804 to perform operations of context analyzer 214 as described above.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations of the invention have been described. Nevertheless, it will be understood that various modifications can be made without departing from the spirit and scope of the invention.

What is claimed is:

1. A method comprising:
   detecting, based upon motion data received by a mobile device, movement experienced by the mobile device;
   determining, by a processor of the mobile device using the motion data, that the movement experienced by the mobile device affects coherent integration of a radio frequency (RF) signal received by the mobile device;
   determining, based upon the motion data, an activity type experienced by the mobile device from a plurality of activity types and a location of the mobile device on a human body from a plurality of possible locations during the movement experienced by the mobile device;
   determining, based upon the activity type and the location of the mobile device on the human body, an acceleration limit from a plurality of acceleration limits, each associated with one of the plurality of activity types and one of the plurality of possible locations of the mobile device on the human body;
   determining, based upon the determined acceleration limit, a coherent integration interval, wherein a duration of the coherent integration interval is configured to compensate for the movement experienced by the mobile device; and
   providing the coherent integration interval to an RF signal processor of the mobile device for performing the coherent integration of the RF signal during the coherent integration interval.

2. The method of claim 1,
   wherein the detecting movement experienced by the mobile device includes one or more sensors of the mobile device providing the motion data, and
   wherein determining the coherent integration interval includes shortening the coherent integration interval upon determining that the movement experienced by the mobile device exceeds a threshold value.

3. The method of claim 1,
   wherein the detecting movement experienced by the mobile device includes one or more sensors of the mobile device providing the motion data, and
   wherein determining the coherent integration interval includes one of shortening and lengthening the coherent integration interval based on a magnitude of the movement experienced by the mobile device, and
   wherein a greater magnitude of the movement experienced by the mobile device corresponds to a shorter coherent integration interval.

4. The method of claim 1,
   wherein the detecting movement of the mobile device includes receiving readings from one or more sensors of the mobile device providing the motion data, and
   wherein determining the coherent integration interval includes one of:
      shortening the coherent integration interval upon determining that the activity type is a designated low-priority activity type; and
      lengthening the coherent integration interval upon determining that the activity type is a designated high-priority activity type.

5. The method of claim 4, wherein the activity type includes one of walking, running, cycling, swimming, driving, and flying.

6. The method of claim 1, further comprising:
   receiving, by the processor of the mobile device, contextual data that includes data indicating a location area of the mobile device, and
   wherein determining the coherent integration interval includes one of:
      shortening the coherent integration interval upon determining that the data indicating a location of the mobile device is in an area designated as strong signal area; and
      lengthening the coherent integration interval upon determining that the data indicating a location of the mobile device is in an area designated as weak signal area.

7. The method of claim 6, wherein determining the coherent integration interval includes one of:
   shortening the coherent integration interval upon determining that the data indicating a location area of the mobile device is in an area where multipath effects are present; and
   lengthening the coherent integration interval upon determining that the data indicating a location area of the mobile device is in an area where multipath effects are absent.

8. The method of claim 1,
   wherein determining the coherent integration interval includes compensating for the movement experienced by the mobile device using the motion data received from at least one of a gyroscope, an accelerometer, a barometer, magnetometer, and a camera.

9. The method of claim 1, further comprising:
   receiving, by the processor of the mobile device, contextual data that includes one of a-priori and real-time information on one of radio jamming and interference, the information on the one of radio jamming and interference being provided by a radio frequency (RF) receiver of the mobile device, and
   wherein determining the coherent integration interval includes determining a length of the coherent integration interval sufficient to overcome the one of radio jamming and interference.

10. The method of claim 1, further comprising:
    receiving, by the processor of the mobile device, contextual data that includes an indication on whether position performance is given a higher priority than a priority for power conservation, and
    wherein adjusting the coherent integration interval includes maximizing the coherent integration interval upon determining that the indication on whether position performance is given a higher priority than a priority for power conservation is that the position performance is given the higher priority.

11. The method of claim 1, further comprising:
    receiving, by the processor of the mobile device, contextual data that includes a measurement of efficiency of an RF antenna, and wherein determining the coherent integration interval includes using extended coherent integration to improve post-correlation sensitivity upon determining that the measurement of efficiency fails to reach a threshold value.

12. The method of claim 1, further comprising:
receiving, by the processor of the mobile device, contextual data that includes a measurement of oscillator stability, and
wherein determining the coherent integration interval comprises designating a coherent time of the oscillator as the coherent integration interval.

13. The method of claim 1, wherein the movement experienced by the mobile device that affects the coherent integration of the RF signal includes at least one of antenna efficiency, signal environment, jamming, interference, and power consumption requirement.

14. The method of claim 1, wherein the RF signal includes a global navigation satellite system (GNSS) signal, and the RF signal processor includes a GNSS processor.

15. A mobile device comprising:
a radio frequency (RF) signal processor including an interface to adjust coherent integration interval of processing RF signals; and
a non-transitory computer-readable medium storing instructions that, when executed by the mobile device, cause the mobile device to perform operations comprising:
detecting, based upon motion data received by a mobile device, movement experienced by the mobile device;
determining, by a processor of the mobile device using the motion data, that the movement experienced by the mobile device affects coherent integration of a radio frequency (RF) signal received by the mobile device;
determining, based upon the motion data, an activity type experienced by the mobile device from a plurality of activity types and a location of the mobile device on a human body from a plurality of possible locations during the movement experienced by the mobile device;
determining, based upon the activity type and the location of the mobile device on the human body, an acceleration limit from a plurality of acceleration limits, each associated with one of the plurality of activity types and one of the plurality of possible locations of the mobile device on the human body;
determining, based upon the determined acceleration limit, a coherent integration interval, wherein a duration of the coherent integration interval is configured to compensate for the movement experienced by the mobile device; and
providing the coherent integration interval to an RF signal processor of the mobile device for performing the coherent integration of the RF signal during the coherent integration interval.

16. The mobile device of claim 15,
wherein the RF signal processor is a global navigation satellite system (GNSS) processor having an interface for receiving the coherent integration interval.

17. A non-transitory computer-readable medium storing instructions that, when executed by one or more processors, cause the one or more processors of a mobile device to perform operations comprising:
detecting, based upon motion data received by a mobile device, movement experienced by the mobile device;
determining, by a processor of the mobile device using the motion data, that the movement experienced by the mobile device affects coherent integration of a radio frequency (RF) signal received by the mobile device;
determining, based upon the motion data, an activity type experienced by the mobile device from a plurality of activity types and a location of the mobile device on a human body from a plurality of possible locations during the movement experienced by the mobile device;
determining, based upon the activity type and the location of the mobile device on the human body, an acceleration limit from a plurality of acceleration limits, each associated with one of the plurality of activity types and one of the plurality of possible locations of the mobile device on the human body;
determining, based upon the determined acceleration limit, a coherent integration interval, wherein a duration of the coherent integration interval is configured to compensate for the movement experienced by the mobile device; and
providing the coherent integration interval to an RF signal processor of the mobile device for performing the coherent integration of the RF signal during the coherent integration interval.

18. The non-transitory computer-readable medium of claim 17,
wherein the detecting movement of the mobile device includes receiving readings from one or more sensors of the mobile device providing the motion data indicating the movement of the mobile device, and
wherein determining the coherent integration interval includes shortening the coherent integration interval upon determining that the movement experienced by the mobile device exceeds a threshold value.

19. The non-transitory computer-readable medium of claim 17,
wherein the detecting movement of the mobile device includes receiving readings from one or more sensors of the mobile device providing the motion data indicating the movement of the mobile device, wherein determining the coherent integration interval includes shortening or lengthening the coherent integration interval based on the movement experienced by the mobile device, and
wherein a greater magnitude of the movement of the mobile device corresponds to a shorter coherent integration interval.

* * * * *